United States Patent
Aaro et al.

(10) Patent No.: US 6,662,020 B1
(45) Date of Patent: Dec. 9, 2003

(54) ARRANGEMENT FOR EFFECTING SECURE TRANSACTIONS IN A COMMUNICATION DEVICE

(75) Inventors: Ingvar Aaro, Åkersberga (SE); Mats Bergman, Lidingö (SE); Kristofer Ekbom, Årsta (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 448 days.

(21) Appl. No.: 09/645,918

(22) Filed: Aug. 25, 2000

(30) Foreign Application Priority Data

Aug. 27, 1999 (SE) .............................................. 9903036

(51) Int. Cl.[7] .............................................. H04M 1/00
(52) U.S. Cl. .............................. 455/552.1; 455/553.1; 455/411
(58) Field of Search ................................. 455/403, 410, 455/418, 419, 552.1, 553.1, 411, 556–558; 325/380–382; 380/247, 249, 255, 266, 270

(56) References Cited

U.S. PATENT DOCUMENTS

| | | | |
|---|---|---|---|
| 4,368,357 A | | 1/1983 | Gurak |
| 4,411,017 A | * | 10/1983 | Talbot ........................... 380/31 |
| 5,060,264 A | * | 10/1991 | Muellner et al. .............. 380/46 |
| 5,065,428 A | * | 11/1991 | Mitchell et al. ............. 713/194 |
| 5,493,693 A | * | 2/1996 | Tanaka et al. ............. 455/33.1 |
| 5,854,985 A | * | 12/1998 | Sainton et al. ............... 455/553 |
| 5,913,175 A | | 6/1999 | Pinault |
| 5,940,799 A | * | 8/1999 | Bruckert et al. ............. 704/273 |
| 6,014,561 A | * | 1/2000 | Molne ......................... 455/419 |
| 6,016,956 A | * | 1/2000 | Takami et al. ............... 235/380 |
| 6,084,968 A | | 7/2000 | Kennedy et al. |
| 6,378,072 B1 | * | 4/2002 | Collins et al. ............... 713/187 |

FOREIGN PATENT DOCUMENTS

| | | |
|---|---|---|
| EP | 0 308 219 A2 | 3/1989 |
| EP | 0 436 518 A2 | 7/1991 |
| EP | 0 617 528 A2 | 9/1994 |
| WO | 96/25828 A1 | 8/1996 |

* cited by examiner

*Primary Examiner*—Lee Nguyen
*Assistant Examiner*—Tuan Tran

(57) ABSTRACT

An arrangement for effecting secure transactions having a device interfaced to at least one communications network is proposed. The device has two modes of operation, and includes a controller that controls the device in a first mode of operation and a display coupled to the controller in the first mode. The device further includes a secure part for controlling the device in a secure mode of operation. This secure part has a secure memory for storing data. This memory is directly coupled to the display in the secure mode of operation. Preferably, the device also includes a keypad or other input device that is directly coupled to the secure memory in the second mode. The hardwired connections to secure memory in the secure mode ensures that data shown on the display is indeed the data that is processed and signed off in the secure mode of operation.

19 Claims, 2 Drawing Sheets

ARRANGEMENT FOR EFFECTING SECURE TRANSACTIONS IN A COMMUNICATION DEVICE

This application claims priority under 35 U.S.C. §§119 and/or 365 to 9903036-3 filed in Sweden on Aug. 27, 1999; the entire content of which is hereby incorporated by reference.

BACKGROUND

The invention is directed to devices capable of communicating over a communication network and that can also effect remote secure transactions, such as electronic payment and the like. Such devices include mobile phones PCs, terminals laptop computers, personal data assistants and electronic organisers.

The use of open platforms such as PCs and terminals both fixed and mobile for communicating over public networks or the Internet and for executing secure transactions is becoming increasingly widespread with the expansion of internet commerce and the possibilities provided by electronic cash transactions and smart cards. For example, WO 96/25828 suggests a method for using a mobile phone for effecting financial transactions such as payments by providing financial applications on a smart card that can be inserted into the mobile phone. The application has two modes of operation; a first mode in which it is passive, and therefore receives instructions from the master controller of the mobile phone or other controlling applications, and a second mode in which it controls the operation of the mobile phone. This includes controlling the operation of a keypad and a display or status indicator of the phone.

While in the past mobile phones have been relatively safe from infiltration by malicious programs such as viruses, with the evolution of protocols such as wireless application protocol (WAP) and GPRS that enable a mobile phone user easy access to computer networks such as the internet, the security of data held and processed within a mobile phone can no longer be assured. In particular, there is a danger that data may be corrupted within the mobile phone or other device. This means that the user cannot be sure that the data he commits to when he confirms information on a screen, is indeed the data that is transmitted to the remote party. There is also a danger that confidential information such as financial data, keys, passwords or PIN-codes entered on the keypad or keyboard could be collected over the network. The same is true for any open platform such as a PC, terminal, laptop or electronic personal assistant that is connected to a network and open to malicious programs such as viruses and the like.

In view of this prior art, it is an object of the present invention to provide an arrangement that ensures an increased level of security for devices that interfaced with a communication network to enable the safe execution of sensitive transactions.

SUMMARY

The invention resides in an arrangement for effecting secure transactions incorporated in a device having an interface to at least one communications network. The device has at least two modes of operation, and includes a controller that controls the device in a first mode of operation and a display which is coupled to the control means in the first mode of operation. The device further includes a secure part for controlling the device in a second, or secure mode of operation. This secure part has a secure memory, or memory area, for storing secure data. This memory is directly coupled to the display in the second or secure mode of operation. Preferably, the device also includes a keypad, keyboard or other input device, which is similarly coupled to the secure memory by a direct connection in the second mode of operation. The arrangement further includes a module for generating and storing secure data, such as keys, certificates and digital signatures, as well as encrypting and decrypting data and verifying signatures. This module is coupled to the secure memory. At least part of the secure part may be mounted on a carrier, such as a smart card.

In accordance with a further aspect, the invention resides in such a self-contained secure part arrangement that may be integrated on a carrier.

By providing a hardwired connection between the display and the secure memory and possibly also between the keyboard and secure memory, with both connections being utilised in the secure mode only, the user can be certain that data displayed on the screen of the device and input into the keypad is the data that will be processed and transmitted to a remote party. In particular, the user can be certain that data relating to a financial or other sensitive transaction shown on the display is indeed the data that he is committing himself to when he signs this off. Data is exchanged using the direct pathway between the display and the secure memory. Malicious programs, such as viruses, which may reach and corrupt the memory of the mobile phone when in its normal operating mode, for example using WAP or GPRS, will not be able to gain access to the secure memory. Thus information displayed on the display prior to its signing off by the cryptographic module cannot be tampered with.

Furthermore, by separating the two modes of operation, it is ensured that data contained in the secure memory cannot be accessed when the device is in the normal mode of operation. This ensures that data remaining in memory after termination of, for example, a financial transaction is safe.

BRIEF DESCRIPTION OF THE DRAWINGS

Further objects and advantages of the present invention will become apparent from the following description of the preferred embodiments that are given by way of example with reference to the accompanying drawings. In the figures.

DETAILED DESCRIPTION

Figure 1:
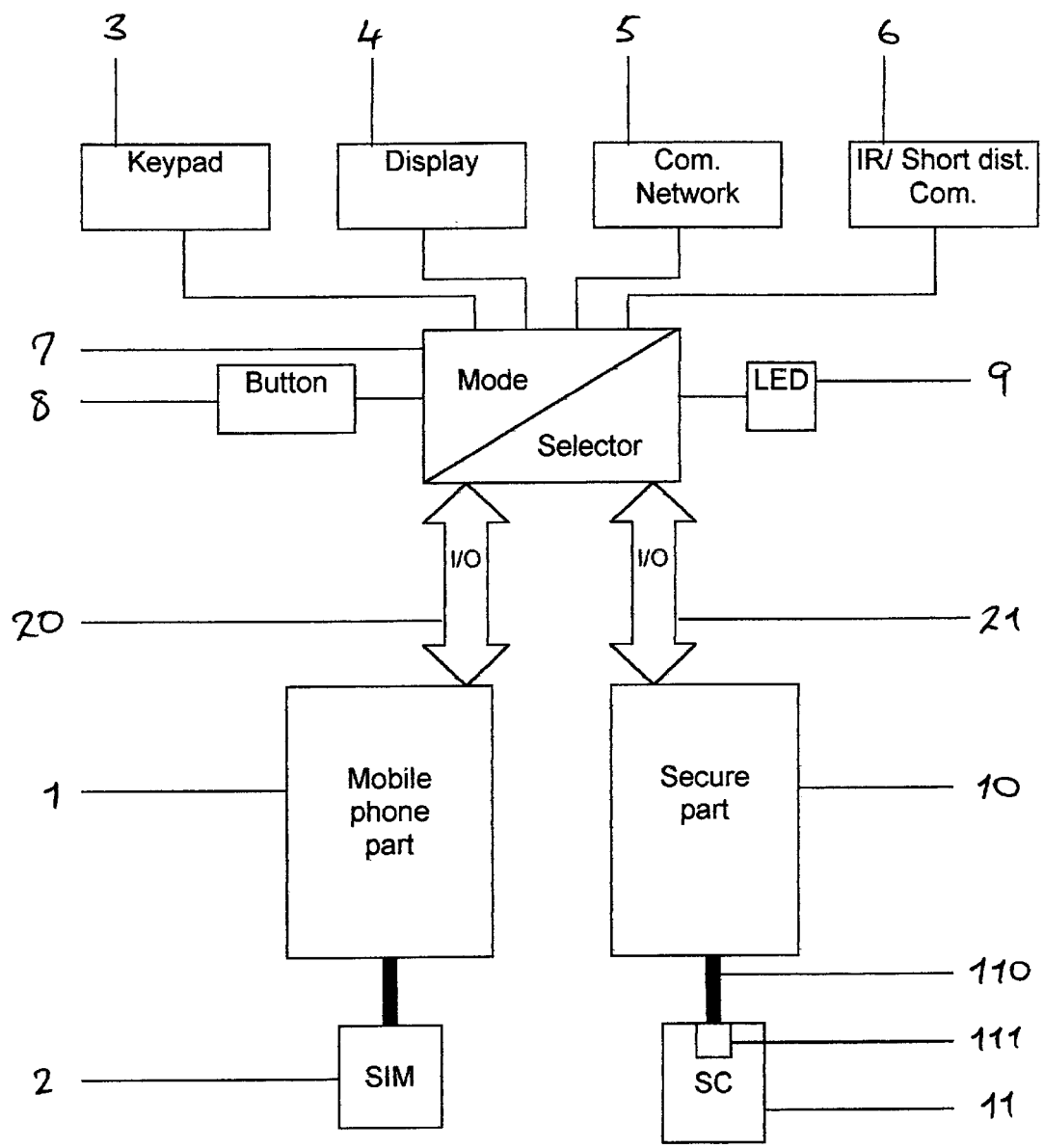
FIG. 1 depicts an overview of a mobile phone as a block diagram and including the secure arrangement in accordance with the present invention.

FIG. 1 is a schematic representation of a mobile telephone. Central to the operation of the device is a phone part 1, which typically comprises a central controller with associated program and temporary memory, for controlling the operation of mobile phone in a known manner. The phone may include a terminal adapted to receiving a removable card 2, such as a SIM card (subscriber identity module) for user identification. The phone further includes known peripheral elements of mobile phones such as a keypad or keyboard 3, a display 4 and an interface to a communication network 5, which will typically include a radio frequency transceiver for communicating with a radio communication network, such as GSM. Other conventional elements such as a microphone, headphone, and ring generator will also be present but are not illustrated here. The phone further includes an assembly 6 for enabling short distance communication. This may include an infrared receiver and transmitter or a transmitter and receiver for short distance radio communication, such as for a "piconet".

A mode selector 7 is connected between the phone part 1 and the peripheral elements 3, 4, 5, 6 of the mobile phone. This mode selector 7 is connected to a mode switch 8, which preferably takes the form of a manual switch such as a button or the like on the casing of the mobile phone. Alternatively, the mode switch 8 may be implemented using software, in which case the user selects the mode using the keypad 3 and display 4. The selector 7 is further connected to a mode indicator 9, which may be an LED, that will be lit or unlit depending on the mode of operation. Alternatively a specific symbol or pictogram may be displayed on the display 4 to indicate the mode of operation. In this case, measures should be taken to ensure that either the pictogram or the area of display can be influenced only when the phone is in secure mode. The mobile phone further includes a secure part 10, which is similarly connected to the mode switch 7. Both the phone part 1 and the secure part 10 interface and exchange data with the peripheral elements of the phone through the mode selector, as indicated by the bidirectional I/O arrows 20, 21 in FIG. 1. The financial part 10 may be a self-contained module within the mobile phone, or it may be provided in part or fully on an external platform such as a removable smart card 11. To this end, the mobile phone includes a smart card adapter terminal, represented by the thick line 110 in FIG. 1. The smart card 11 itself is also provided with a terminal 111 for connecting to the adapter 110.

Figure 2:
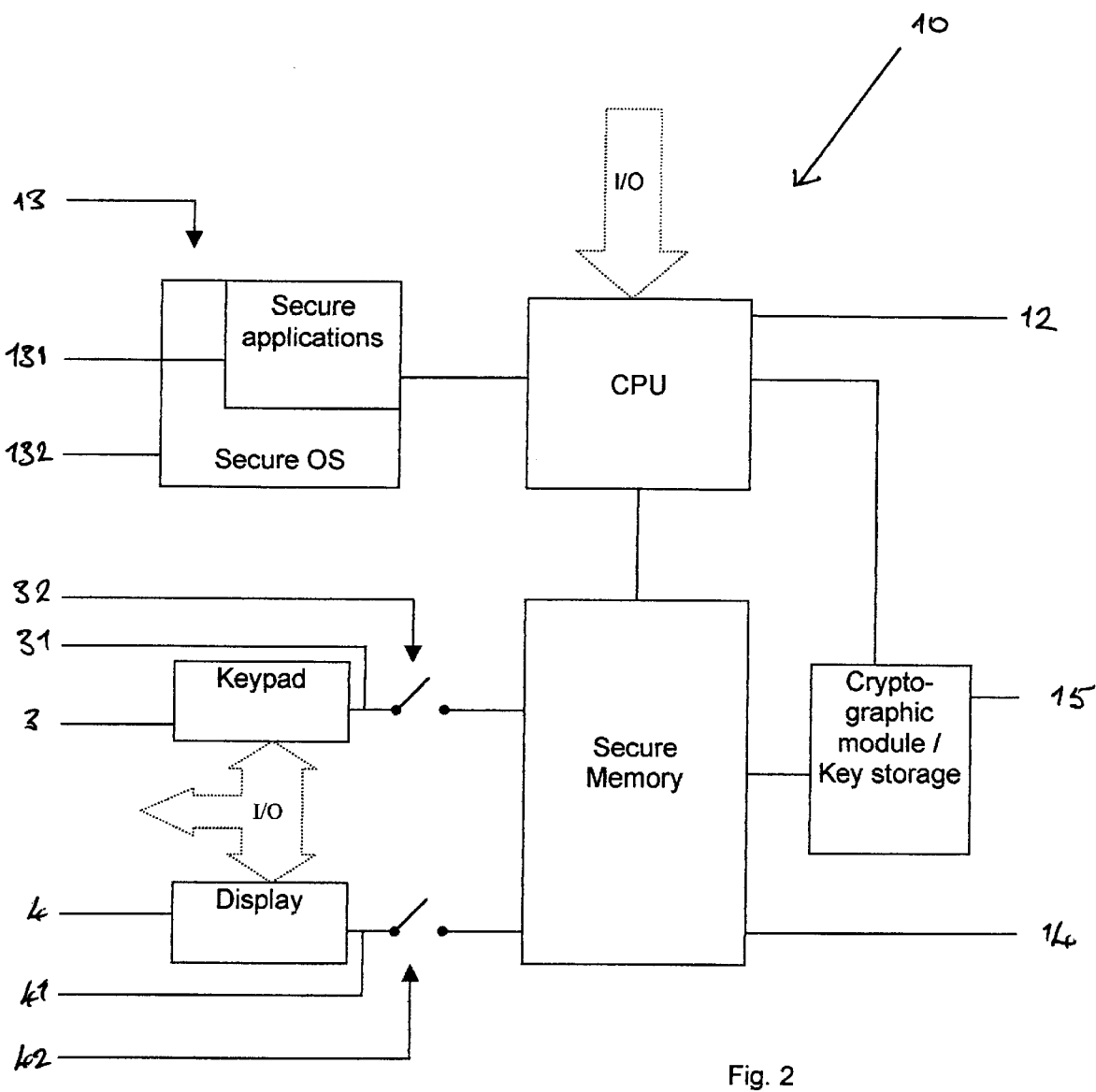
FIG. 2 schematically depicts part of the mobile phone of FIG. 1 illustrating the secure arrangement in detail.

The mobile phone is capable of operating in two distinct modes. In a first mode of operation, the phone functions as a conventional mobile phone. In the second, or secure, mode of operation, applications relating to secure transactions controlled by the secure part 10 are run by the mobile phone. The mode switch 8 allows the user to determine in which mode the mobile station should operate. Depending on the position of the mode switch 8, the mode selector 7 switches between operation controlled by the phone part 1 and operation controlled by the secure part 10. The mode indicator 9 indicates the choice of mode. In the preferred embodiment wherein the mode indicator 9 comprises an LED, this is lit when the mobile phone is in secure mode. Turning now to FIG. 2, the secure part 10 is illustrated in more detail. A central processor or CPU 12 controls the operation of the secure part 10. The CPU exchanges data with the peripheral devices as illustrated by the dotted block arrow I/O. A non-volatile memory 13, which may be an EPROM is provided for storing various software applications 131. These applications 131 relate to transactions of a sensitive nature and may include, but are not limited to, applications for remote payment by electronic cash, for debiting, crediting or consulting debit or credit accounts with a financial institution or for executing non-financial undertakings such as electronic ticketing or signing of contracts, or the like. Preferably these applications are certified by one or more financial or legal institutions. The non-volatile memory 13 also preferably contains a secure operating system 132, for controlling the running of the secure applications. The CPU 12 is also connected to a secure memory 14. This may be implemented in volatile memory, such as RAM or in non-volatile memory such as EEPROM, depending on the nature of the information stored. For example, a balance enquiry from a bank or a payment requiring only the transmission of a secure identification would not require permanent memory. The payment by electronic cash, where the mobile phone stores a credit record that is updated regularly would require permanent memory. The secure part 10 further includes a cryptographic module 15 for generating, verifying and storing keys, generating digital signatures and for encrypting and decrypting data sent and received over the communication network 5 or the IR link 6, and that relate to secure transactions. The cryptographic module 15 is connected to the CPU and also directly to the secure memory 14.

The display 4 is also coupled to the secure memory 14 by a direct connection 41. This connection 41 allows the display 4 to access the secure memory directly when the device is operating in a secure mode. In the other mode of operation, access to this secure memory 14 is impossible. The access to the phone part 1 in the normal mode of operation is illustrated in FIG. 2 by the dotted block arrow I/O. The connection 41 between the secure memory 14 and the display 4 is preferably implemented in hardware, and may include a switch 42 which is actuated upon switching of the mode switch 8 or mode selector 7. However, this connection 41 could be protected by software, such that it is utilised only in the secure mode of operation.

By providing a hardwired connection between the display 4 and the secure memory 14 that is utilised in the secure mode, the user can be certain that data displayed on the screen relating to a financial or other sensitive transaction is indeed the data that will be signed off using the cryptographic module 15. Data is exchanged using the direct pathway 41 between the display and the secure memory 14. Malicious programs, such as viruses, which may reach and corrupt the memory of the mobile phone part 1 when the mobile station is in normal mode, for example using WAP or GPRS, will not gain access to the secure memory 14. Thus such malicious programs could not tamper with information displayed on the display 4 prior to its signing off by the cryptographic module 15. Once the cryptographic module 15 has encrypted the information contained in the secure memory 14 for transmission to a remote party, any corruption of the encrypted data will be detected by the remote party by the normal built-in error detection functions.

Preferably, the keyboard 3, which its associated keyboard buffer (not shown) is also directly connected to the secure memory 13 by a connection 31, with this connection 31 being open only in the secure mode of operation, as for the display 4. Here again the connection 31 could comprise a switch 32 which is closed upon actuation of the mode selector 7 or mode switch 8 only in the secure mode of operation. Alternatively, blocking of the connection 31 could be implemented in software. This additional hardwired connection 31 further increases the level of security, as any data entered by the user will be input directly to the secure memory and will not have to be fetched from the memory of the mobile phone part 1, which may lay it open to corruption.

The secure memory 14 is accessed only by the cryptographic module 15 and the CPU 12, display 4 and possibly the keypad 3, or rather its buffer, in the secure mode of operation. In the normal mobile phone mode of operation, access to this secure memory 14 is impossible. Thus any data remaining in the secure memory 14 after a secure transaction is terminated is safe.

When in the secure mode of operation the mobile phone is able to run only the software contained in the secure part 10, and which is preferably certified by financial institutions. Moreover, the exclusive control of the display 4 and possibly also the keypad 3 by the secure part 10 in the secure mode further ensures that information input on the keypad 3 cannot be read by other applications in the mobile phone part 1. Only secure software contained in the secure part 10 is able to present information on the display, and when digital signatures are created by the cryptographic module, the hardwired connection between the secure memory 14 and the display 4 means that the information displayed on the display is identical to the information that is digitally signed.

However, in the secure mode of operation, the mobile phone may continue to process calls. The secure part 10 has control of the keypad and display, but other functions not requiring these peripheral devices may still be carried out by the mobile phone. This allows a payment or other transaction to be made during an ongoing telephone call.

As mentioned above, some of the components of the secure part 10 illustrated in FIG. 2 may be comprised in a smart card 11. These components include the CPU 12, its associated non-volatile memory 13, the cryptographic device 15 and the secure memory 14. It will be understood by those skilled in the art that a smart card 11 may carry. all or only some of these components. The display device 4 and keypad 3 obviously form part of the mobile phone. The direct hardwired connections 31, 41 between the display 4 and keypad 3, respectively, and the memory 14 must also be implemented at least in part in the mobile phone. These lines in addition to the I/O bus will therefore be present in the terminal adapters 110 and 111 of the mobile phone and the card. However, the switches 32, 42, could either be integrated in the mobile phone platform or be disposed on the smart card, that is on either side of the smart card adapters 110, 111 provided in the mobile phone and the card 11, respectively. It is, however, preferable that the switches be provided within the mobile phone to simplify their control by the mode selector 7. Preferably, the secure memory 14 and the CPU 12 are implemented on the mobile phone platform to ensure minimum delay when accessing the keyboard 3 and display 4. The applications 131 and cryptographic module 15 with the stored keys could be provided on the smart card 11, in which case the application could usefully be downloaded into a reserved memory area on the mobile phone for execution.

While in the embodiment described above, the secure part 10 includes a dedicated CPU, this need not be the case. The central controller of the mobile phone part 1 may accomplish the tasks effected by this CPU. Furthermore, the secure memory 14 need not be a separate component, but could be a reserved area of memory provided in the mobile phone part. Access to this reserved memory area would be provided only for the cryptograhic module 15 and the display 4 and keypad 3 when the phone is in secure mode.

The arrangement according to the invention is not limited to mobile phones, but may be employed in any mobile or indeed fixed terminal having access to a communications network. Examples of these include terminals, PCs, laptop computers, electronic organisers, personal digital assistants and internet access devices. The division of these devices into a normal operating part and a secure part will be analogous to that illustrated in the figures for the mobile phone part 1 and the secure part 10. In these other devices, a dedicated secure memory or memory area will be provided that can be accessed only by the cryptographic module and the display and possibly also the keyboard in the secure mode of operation. As for the mobile phone described above, the secure part 10 could be provided at least in part by a smart card. Also, the secure part need not dispose of a dedicated CPU but could use the processor already present in the platform device.

What is claimed is:

1. An arrangement for effecting secure transactions, comprising:
    a device having an interface to at least one communication network and having a non-secure mode and a secure mode of operation, said secure mode providing for encryption and decryption of data sent over the communication network for effecting secure transactions;
    a controller for controlling the device in the non-secure mode of operation;
    a display coupled to the controller in the non-secure mode of operation; and
    secure means for controlling the device in the secure mode of operation, the secure means including a memory for storing secure data;
    wherein the display is directly coupled to the secure-data memory in the secure mode of operation.

2. The arrangement of claim 1, further comprising an input device that is coupled to the controller in the non-secure mode of operation and directly coupled to the memory in the secure mode of operation.

3. The arrangement of claim 2, wherein the input device is coupled to the memory by a hardwired connection comprising a second switch.

4. The arrangement of claim 1, wherein the display is coupled to the memory by a hardwired connection comprising a second switch.

5. The arrangement of claim 1, further comprising a first switch for switching the mode of operation of the device between the non-secure and secure modes.

6. The arrangement of claim 5, wherein the second switch is controlled by the first switch.

7. The arrangement of claim 5, wherein the first switch includes a manually operable switch disposed on the device.

8. The arrangement of claim 1, further comprising an indicator for indicating the operating mode of the device.

9. The arrangement of claim 1, wherein the secure means includes at least one application for processing secure data.

10. The arrangement of claim 9, wherein the secure means includes a processor for executing the at least one application when the device is in the secure mode of operation, wherein execution of the application results in generation, verification, and storage of keys, and encryption and decryption of data sent and received over the communications network.

11. The arrangement of claim 10, wherein the processor is inoperative when the device is in the non-secure mode of operation.

12. The arrangement of claim 1, wherein the secure means includes a data generator that is coupled to the memory and that generates secure data.

13. The arrangement of claim 1, wherein at least a portion of the secure means is disposed on a carrier adapted to connect with the device.

14. The arrangement of claim 13, wherein the carrier is a smart card.

15. The arrangement of claim 1, wherein the device is a mobile communication device.

16. An arrangement for effecting secure transactions, comprising:
    at least one application for processing secure data;
    a processor for executing the at least one application, thereby generating encrypted data;
    a secure memory for storing secure data; and
    means for connecting with a communications device having a display, said connecting means comprising:

means for passing the encrypted data to and from a communications device that transmits and receives the encrypted data over a communications network; and at least one line for directly coupling the secure memory with the display on the communications device.

17. The arrangement of claim 16, wherein the communications device also has an input device, and the connecting means includes at least one further line for directly coupling the secure memory with the input device.

18. The arrangement of claim 16, further including a data generator for generating secure data.

19. The arrangement of claim 16, wherein the arrangement is disposed on a carrier.

* * * * *